(No Model.) 2 Sheets—Sheet 1.
J. C. MINER.
CHECK ROWER FOR CORN PLANTERS.
No. 500,408. Patented June 27, 1893.
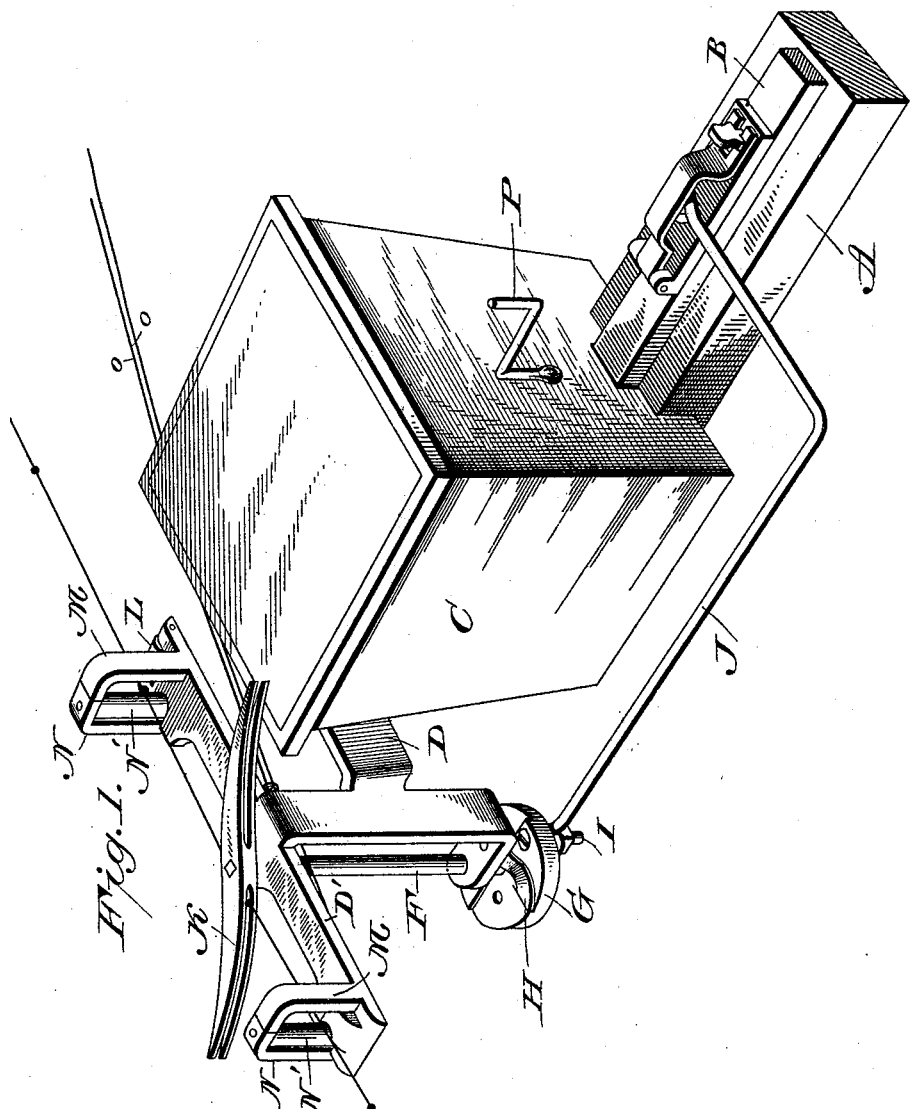

(No Model.) 2 Sheets—Sheet 2.
J. C. MINER.
CHECK ROWER FOR CORN PLANTERS.
No. 500,408. Patented June 27, 1893.
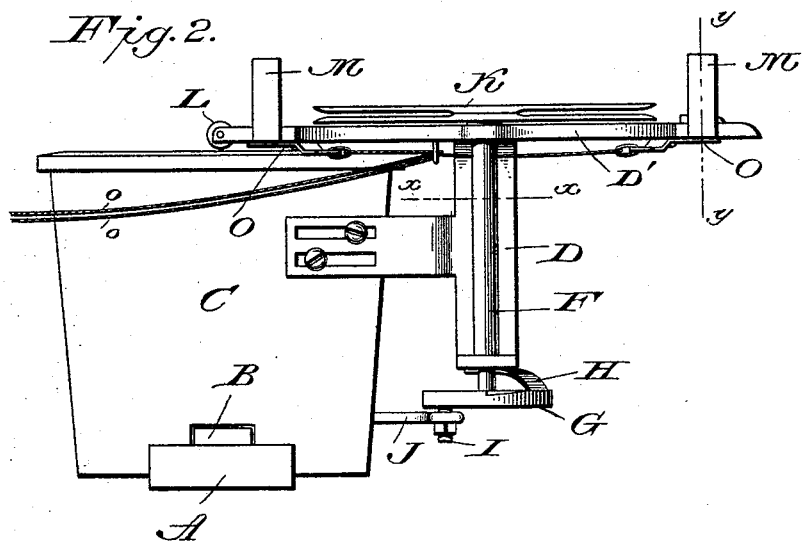
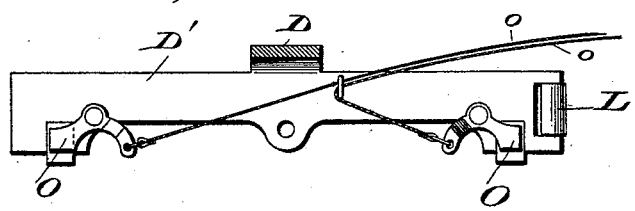
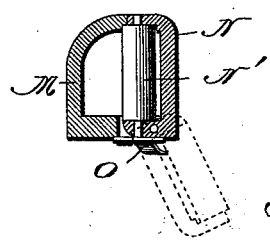
Witnesses G. S. Elliott.
C. W. Johnson.
John C. Miner.
Inventor
by
Attorney

UNITED STATES PATENT OFFICE.

JOHN C. MINER, OF SMYRNA, ASSIGNOR OF ONE-HALF TO HENRY FOX, JR., OF NELSON, NEBRASKA.

CHECK-ROWER FOR CORN-PLANTERS.

SPECIFICATION forming part of Letters Patent No. 500,408, dated June 27, 1893.

Application filed February 2, 1893. Serial No. 460,636. (No model.)

*To all whom it may concern:*

Be it known that I, JOHN C. MINER, a citizen of the United States of America, residing at Smyrna, in the county of Nuckolls and State of Nebraska, have invented certain new and useful Improvements in Check-Rowers for Corn-Planters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in check-rowers for corn planters, in which the seed slide is operated by means of a check-row cord or wire, which engages with an arm carried by the frame of the planter, so that when the planter is drawn across the field the slide will be operated to drop the seed at intervals.

The invention relates more particularly to the special construction of the frame to which the arm that operates the seed slide is pivoted, and means carried thereby, which permit the check-row cord or wire to be readily released when the end of a row is reached, or at any other time.

In the accompanying drawings, Figure 1 is a perspective view, showing my improvements applied. Fig. 2 is a side elevation. Fig. 3 is a sectional view on the line $x$—$x$ of Fig. 2, looking in the direction of the arrow. Fig. 4 is a sectional view through the line $y$—$y$ of Fig. 2.

A designates a beam which extends across the frame of the planter and supports similar check-rower devices at each end, only one being shown in the drawings.

B designates the seed-slide, which is reciprocated by the mechanism actuated by the check-row cord, and C designates one of the seed boxes which are supported upon the beam A, and into which passes the seed-slide.

To one side of the seed-box is secured a bracket, D, the upper end of which is extended on each side to provide a horizontal plate D', while the lower end is bent to one side to form a bearing for a vertical shaft, F, the upper end of said shaft passing through an aperture in the horizontal plate D'. The bracket is adjustably attached to the seed-box by providing slots as shown, so that the attachment can be adjusted to suit the requirements of planters of different sizes.

Upon the lower end of the shaft F is rigidly attached a disk, G, the upper face of which is provided with notches with which a flat spring-plate H, attached to the lower end of the bracket, engages to prevent the rotation of the shaft and parts carried thereby, except in one direction. Upon the under side of this disk is attached a wrist-pin I, to which is connected a pitman-rod J, said pitman-rod being bent around the seed-box, as shown in Fig. 1, so as to engage with the seed-slide. The pitman-rod is attached to the seed-slide by providing said seed-slide with an upwardly-projecting pin and hinged retaining plate, so that the pitman-rod can be disconnected when the check-row cord is operating the attachment on the other seed-box. The disk G is provided with a row of perforations radiating from its center, so that the throw or movement of the seed-slide can be varied by inserting the wrist-pin in the proper aperture.

Upon the upper end of the shaft F is secured an arm K, the members of said arm, located on each side of the shaft, being bifurcated to receive the check-row cord or wire and be engaged by the tappets formed thereon; these members are curved in opposite directions, so that as the tappet passes from one member the other member will be moved to engage the next tappet on the wire. One end of the horizontal plate D' is provided with a guide-roller, L, while the other end is beveled as shown, and near each end of this plate are formed upwardly projecting standards M M, the upper ends of which are bent in, as shown. Adjoining these standards are pivoted frames N N, which when raised to a vertical position bear against the upper ends of said standards and form a loop within which the check-row cord or wire is guided, said frames being provided with friction rollers N', as shown. These frames are retained in a vertical position by trip levers O O which bear against the under side of the frame and are operated by flexible connections which pass through a guide and extend to the driver's seat. When the levers are moved out of engagement with the frames said frames will drop by gravity and release the check row cord or wire.

The seed box has attached thereto an arm or bracket P, which serves as a support for pitman-rod J when it is detached from the seed-slide.

In operation, the frames carrying the rollers are permitted to swing open to receive the check-row wire and are then retained in a horizontal position by means of the trip-bars; now as the planter moves across the field the tappets on the wire will engage with the members of the arm K and cause a rotation of the shaft F, which movement is imparted to the seed-slide, by the pitman-rod J, so as to cause a reciprocation of the same. When the end of the row is reached, or at any other time it is desired to drop the check-row wire or cord, the driver simply draws upon the flexible connections o o, which trips the frames and permits them to fall, when the check-row cord will at once become disengaged from the planter.

I am aware that prior to my invention it has been proposed to provide pivoted frames carrying rollers, or grooved sheaves, over which the check-row cord passes, so that the frames can be moved to release the cord, and I do not claim such construction broadly; but What I do claim as new, and desire to secure by Letters Patent, is—

1. As an attachment for a corn planter, a bracket or frame D having bearings for a vertical shaft which carries at its upper end an arm and at its lower end a disk, said bracket having a horizontal plate to which frames carrying rollers are hinged, said frames being adapted to bear against vertical standards, substantially as shown, and for the purpose set forth.

2. In a check-row corn planter, the combination of a vertical shaft carried by a suitable bracket and provided at its upper end with an arm, the lower end of said shaft carrying a disk G the upper face of which is notched, a flat spring plate attached to the bracket and adapted to engage the notches in the disk, and a pitman-rod J connected to the disk and to the seed-slide, substantially as shown, and for the purpose set forth.

3. In an attachment for a check-row corn planter, constructed substantially as shown and provided with a pitman-rod J, a seed slide having an upwardly projecting pin with which said pitman-rod engages and a pivoted plate which is adapted to be moved over and retained in place upon said pin, together with a bracket adapted to support the pitman-rod when disengaged from the seed-slide, substantially as shown.

In testimony whereof I affix my signature in presence of two witnesses.

JOHN C. MINER.

Witnesses:
SETH C. WARREN,
HENRY FOX, Jr.